US012631558B2

(12) United States Patent
Li et al.

(10) Patent No.: US 12,631,558 B2
(45) Date of Patent: May 19, 2026

(54) MICROFLUIDIC ION DETECTION CHIP HAVING BUBBLE BRIGHTENING STRUCTURE, AND DETECTION METHOD THEREOF

(71) Applicant: South China University of Technology, Guangzhou (CN)

(72) Inventors: Zongtao Li, Guangzhou (CN); Hong Wang, Guangzhou (CN); Yongheng Xing, Guangzhou (CN); Jiasheng Li, Guangzhou (CN); Jiexin Li, Guangzhou (CN); Zhou Lu, Guangzhou (CN); Junhao Wu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 495 days.

(21) Appl. No.: 18/264,988

(22) PCT Filed: Oct. 19, 2021

(86) PCT No.: PCT/CN2021/124666
§ 371 (c)(1),
(2) Date: Aug. 10, 2023

(87) PCT Pub. No.: WO2022/193641
PCT Pub. Date: Sep. 22, 2022

(65) Prior Publication Data
US 2024/0125699 A1    Apr. 18, 2024

(30) Foreign Application Priority Data

Mar. 19, 2021    (CN) ........................ 202110293523.X

(51) Int. Cl.
*G01N 21/63*        (2006.01)
*B01L 3/00*         (2006.01)
(Continued)

(52) U.S. Cl.
CPC ........ *G01N 21/63* (2013.01); *B01L 3/502707* (2013.01); *G01N 21/01* (2013.01);
(Continued)

(58) Field of Classification Search
None
See application file for complete search history.

(56) References Cited

U.S. PATENT DOCUMENTS

2006/0188403 A1    8/2006  Parng et al.
2015/0114093 A1*   4/2015  Appleyard ......... G01N 15/1484
                                                73/61.59
(Continued)

FOREIGN PATENT DOCUMENTS

CN        102788780 A     11/2012
CN        103207257 A  *   7/2013
(Continued)

OTHER PUBLICATIONS

Translation of CN 103115860 B, Hu, Li-ming, Jul. 29, 2015 (Year: 2015).*
(Continued)

*Primary Examiner* — Henry H Nguyen
(74) *Attorney, Agent, or Firm* — Espstein Drangel LLP; Robert L. Epstein

(57)        ABSTRACT

A microfluidic ion detection chip having a bubble brightening structure includes a substrate, an upper plate, two glass cover plates, and a foam board. The substrate is provided with a fluid mixing region, a lower optical detection through hole, and a lower gas flow channel. The upper plate is adhesively connected to the substrate and is provided with a sample outlet, an upper optical detection through hole, an upper gas flow channel, and two sample inlets, the upper gas flow channel and the lower gas flow channel are combined to form a gas flow channel. The two glass cover plates are (Continued)

respectively disposed at the lower optical detection through hole and the upper optical detection through hole. The foam board is provided with a foaming structure capable of generating bubbles and a surfactant coated on the foam board, the foam board is disposed at the gas flow channel.

11 Claims, 3 Drawing Sheets

(51) Int. Cl.
   *G01N 21/01*          (2006.01)
   *G01N 21/31*          (2006.01)
(52) U.S. Cl.
   CPC ........ *G01N 21/31* (2013.01); *B01L 2200/147* (2013.01); *B01L 2300/0816* (2013.01); *B01L 2300/163* (2013.01)

(56)                References Cited

U.S. PATENT DOCUMENTS

| | | | | |
|---|---|---|---|---|
| 2019/0247808 | A1* | 8/2019 | Yoo | C01B 32/198 |
| 2020/0171498 | A1* | 6/2020 | Oliphant | B01L 3/502776 |

FOREIGN PATENT DOCUMENTS

| | | | | |
|---|---|---|---|---|
| CN | 103115860 | B | * | 7/2015 |
| CN | 105233892 | A | | 1/2016 |
| CN | 106215985 | A | | 12/2016 |
| CN | 113049546 | A | | 6/2021 |
| KR | 100819452 | B1 | | 4/2008 |

OTHER PUBLICATIONS

Translation of CN 103207257 A, Zhao, Sui, Jul. 17, 2013 (Year: 2013).*

* cited by examiner

400

MICROFLUIDIC ION DETECTION CHIP HAVING BUBBLE BRIGHTENING STRUCTURE, AND DETECTION METHOD THEREOF

CROSS-REFERENCE TO RELATED APPLICATIONS

This application is a national stage filing under 35 U.S.C. § 371 of international application number PCT/CN2021/124666, filed Oct. 19, 2021, which claims priority to Chinese patent application No. 202110293523X filed Mar. 20, 2021. The contents of these applications are incorporated herein by reference in their entirety.

TECHNICAL FIELD

The disclosure relates to the technical field of ion detection chips, and particularly to a microfluidic ion detection chip having a bubble brightening structure and a detection method thereof.

BACKGROUND

Water environment is one of the environmental components, and is also the field most seriously damaged and affected by human beings. Water environmental pollution has become one of major environmental problems in the world today. There are a wide range of ions polluting the water environment, comprising iron ions, mercury ions, complex ions, and the like, and contents of these ions are low and may be as low as 1 uM, so the analysis method must be sensitive, accurate, rapid, and automated, and the like. At present, common ion detection methods comprise complexometric titration, electrochemical analysis, high performance liquid chromatography, ion chromatography, gas chromatography, fluorescence analysis, atomic absorption spectrometry, mass spectrometry, and the like. While continuing to develop a large-scale and precise monitoring system, researches on small and portable, automatic and continuous, and simple and rapid monitoring technology are also urgently needed. Therefore, the microfluidic chip technology plays an extremely important role in the research process in this field. However, as for most microfluidic chips, especially microfluidic chips for optical detection of ion concentration based on absorbance and fluorescence, liquid to be detected is often not bright enough to be detected by a photoelectric detector due to size limitation, resulting in most of these microfluidic chips being unable to detect ions at extremely low concentration.

SUMMARY

The disclosure aims to solve at least one of the technical problems in the exiting technology, and provides a microfluidic ion detection chip having a bubble brightening structure.

The disclosure further provides an ion detection method using the microfluidic ion detection chip having a bubble brightening structure according to an embodiment in a first aspect.

According to an embodiment in a first aspect of the disclosure, a microfluidic ion detection chip having a bubble brightening structure is provided, which comprises a substrate, an upper plate, two glass cover plates, and a foam board, wherein the substrate is provided with a fluid mixing region, a lower optical detection through hole, and a lower gas flow channel, the upper plate is adhesively connected to the substrate, the upper plate is provided with a sample outlet, an upper optical detection through hole, an upper gas flow channel, and two sample inlets, the upper gas flow channel and the lower gas flow channel are combined to form a gas flow channel, the two glass cover plates are respectively disposed at the lower optical detection through hole and the upper optical detection through hole, the two glass cover plates are respectively bonded to the substrate and the upper plate, the glass cover plates are configured for cooperating with ion optical detection, the foam board is provided with a foaming structure capable of generating bubbles and a surfactant coated on the foam board, and the foam board is disposed at the gas flow channel.

Beneficial effects: the microfluidic ion detection chip having a bubble brightening structure comprises the substrate, the upper plate, the two glass cover plates, and the foam board, wherein the substrate is provided with the fluid mixing region, the lower optical detection through hole, and the lower gas flow channel, the upper plate is adhesively connected to the substrate, the upper plate is provided with the sample outlet, the upper optical detection through hole, the upper gas flow channel, and the two sample inlets, the upper gas flow channel and the lower gas flow channel are combined to form the gas flow channel, the two glass cover plates are respectively disposed at the lower optical detection through hole and the upper optical detection through hole, the two glass cover plates are respectively bonded to the substrate and the upper plate, the glass cover plates are configured for ion optical detection, the foam board is provided with the foaming structure capable of generating bubbles and the surfactant coated on the foam board, the foam board is disposed at the gas flow channel. Gas is introduced into the gas flow channel through a gas pump, so that mixed liquid generates bubbles at the upper optical detection through hole and the lower optical detection through hole to achieve a brightening function, and the brightness of liquid to be detected is effectively improved, thus improving a limit of detection.

In the microfluidic ion detection chip having a bubble brightening structure according to an embodiment in the first aspect of the disclosure, sizes of the substrate and the upper plate are the same, lengths of the substrate and the upper plate both range from 3 cm to 5 cm, widths of the substrate and the upper plate both range from 3 cm to 5 cm, and thicknesses of the substrate and the upper plate both range from 0.5 cm to 2 cm.

In the microfluidic ion detection chip having a bubble brightening structure according to an embodiment in the first aspect of the disclosure, the substrate and the upper plate are made of PMMA. PDMS, or a quartz material, and the substrate and the upper plate are bonded through a UV adhesive.

In the microfluidic ion detection chip having a bubble brightening structure according to an embodiment in the first aspect of the disclosure, a circular channel for placing the foam board is disposed in the gas flow channel, a diameter of the circular channel ranges from 4 mm to 6 mm, a thickness of the circular channel ranges from 1 mm to 1.5 mm, the foam board is circular, a diameter of the foam board ranges from 4 mm to 6 mm, and a thickness of the foam board ranges from 1 mm to 1.5 mm.

In the microfluidic ion detection chip having a bubble brightening structure according to an embodiment in the first aspect of the disclosure, the foaming structure is porous or grooved, and the surfactant is sodium aliphatate, AEC, or AES.

In the microfluidic ion detection chip having a bubble brightening structure according to an embodiment in the first aspect of the disclosure, the fluid mixing region is provided with a microchannel, the microchannel is linear, serpentine, or S-shaped, a width of the microchannel ranges from 500 μm to 300 μm, and a depth of the microchannel ranges from 30 μm to 200 μm.

In the microfluidic ion detection chip having a bubble brightening structure according to an embodiment in the first aspect of the disclosure, diameters of the upper optical detection through hole and the lower optical detection through hole both range from 15 mm to 20 mm, the lower optical detection through hole is connected with the fluid mixing region through the microchannel, and diameters of the sample inlet and the sample outlet range from 500 μm to 3,000 μm.

In the microfluidic ion detection chip having a bubble brightening structure according to an embodiment in the first aspect of the disclosure, the glass cover plates are both circular, with a diameter ranging from 500 μm to 3,000 μm and a thickness ranging from 1 mm to 2 mm, one of the glass cover plates is connected with the upper plate at the upper optical detection through hole through plasma bonding and hot pressing, and the other glass cover plate is connected with the substrate at the lower optical detection through hole through plasma bonding and hot pressing.

An ion detection method using the microfluidic ion detection chip having a bubble brightening structure according to an embodiment in the first aspect is provided, which comprises:

S1: respectively connecting the two sample inlets and the sample outlet with a detection reagent pool, a to-be-detected reagent pool, and a waste liquid recovery pool through a peristaltic pump and a polytetrafluoroethylene tube;

S2: connecting the gas flow channel with a gas pump through a polytetrafluoroethylene tube; and S3: placing an excitation light source below an optical detection region, and placing a photoelectric detector above the optical detection region to receive and send a photoelectric detection signal.

In the ion detection method according to an embodiment in the second aspect, the polytetrafluoroethylene tube is connected with the sample inlet through epoxy resin, the detection reagent pool is filled with a solution changeable in an optical parameter such as brightness or absorbance due to reaction with corresponding ions to be detected, the to-be-detected reagent pool is filled with heavy metal ions polluting water quality, a flow rate of the gas pump ranges from 0.8 L/min to 1.3 L/min, the excitation light source is an ultraviolet lamp or a blue LED, and the photoelectric detector is an optical fiber probe or a CCD cosine detector.

BRIEF DESCRIPTION OF THE DRAWINGS

The disclosure is further described hereinafter with reference to the drawings and embodiments.

4

Figure 4:
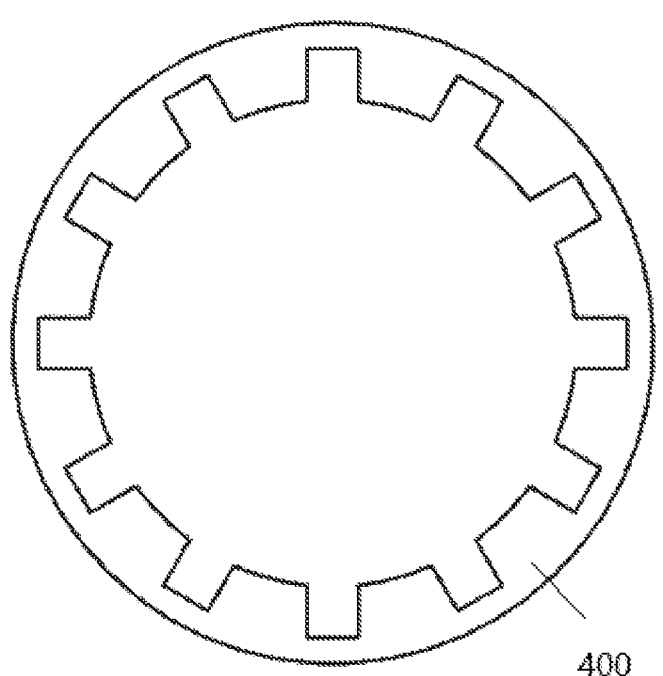
Figure 5:
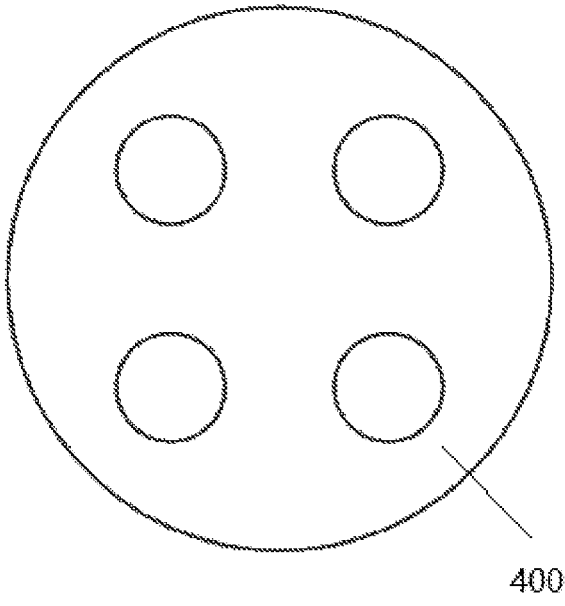

FIG. 4 shows a grooved foam board according to an embodiment of the disclosure; and FIG. 5 shows a porous foam board according to an embodiment of the disclosure.

DETAILED DESCRIPTION

Specific embodiments of the disclosure will be described in detail in this part, preferred embodiments of the disclosure are shown in the drawings, and the drawings are intended to replenish the description in the written part of the specification with figures, so that people can intuitively and vividly understand each technical feature and the overall technical solution of the disclosure, but it cannot be understood as a limitation to the scope of protection of the disclosure.

In the description of the disclosure, it should be understood that, the orientation or position relationship related to the orientation description, such as the orientation or position relationship indicated by the terms "upper", "lower", "front", "rear", "left", "right", and the like is based on the orientation or position relationship shown in the drawings, which is only used for convenience of the description of the disclosure and simplification of the description instead of indicating or implying that the indicated device or element must have a specific orientation, and be constructed and operated in a specific orientation, and thus should not be understood as a limitation to the disclosure.

In the description of the disclosure, the meaning of several refers to being one or more, and the meaning of multiple refers to being two or more. The meanings of greater than, less than, more than, etc., are understood as not including this number, while the meanings of above, below, within, etc., are understood as including this number. If there is the description of first and second, it is only for the purpose of distinguishing technical features, and should not be understood as indicating or implying relative importance, implicitly indicating the number of the indicated technical features or implicitly indicating the order of the indicated technical features.

In the description of the disclosure, unless otherwise explicitly defined, the terms "setting", "mounting" and "connecting" should be understood in a broad sense, and those of ordinary skills in the art can reasonably determine the specific meanings of the above terms in the disclosure in combination with the specific contents of the technical solution.

With reference to FIG. 1 to FIG. 5, a microfluidic ion detection chip having a bubble brightening structure comprises a substrate 100, an upper plate 200, two glass cover plates 300, and a foam board 400. The substrate 100 is provided with a fluid mixing region 110, a lower optical detection through hole 120, and a lower gas flow channel 130, and the upper plate 200 is adhesively connected to the substrate 100. The upper plate 200 is provided with a sample outlet 210, an upper optical detection through hole 220, an upper gas flow channel 230, and two sample inlets 240, and the upper gas flow channel 230 and the lower gas flow channel 130 are combined to form a gas flow channel for cooperating with the foam board 400 to foam. The two glass cover plates 300 are respectively disposed at the lower optical detection through hole 120 and the upper optical detection through hole 220, the two glass cover plates 300 are respectively bonded to the substrate 100 and the upper plate 200 for cooperating with ion optical detection. The glass cover plates 300 are configured for cooperating with ion optical detection, the foam board 400 is provided with a foaming structure capable of generating bubbles and a surfactant coated on the foam board 400, the foam board 400 is disposed at the gas flow channel, and the foam board 400 can achieve a brightening function for detection. The microfluidic ion detection chip has the characteristics of miniaturization and simple structure, the gas flow channel and the foam board 400 added can effectively make bubbles enter an optical detection region, and brightness of liquid to be detected in the optical detection region is improved based on the total reflection principle.

It is understandable that, sizes of the substrate 100 and the upper plate 200 are the same, lengths of the substrate 100 and the upper plate 200 both range from 3 cm to 5 cm, widths of the substrate and the upper plate both range from 3 cm to 5 cm, and thicknesses of the substrate and the upper plate both range from 0.5 cm to 2 cm. Further, the substrate 100 and the upper plate 200 are made of PMMA, PDMS, or a quartz material, and the substrate 100 and the upper plate 200 are bonded through a UV adhesive.

With reference to FIG. 4 and FIG. 5, after the substrate 100 is bonded to the upper plate 200, the upper gas flow channel 230 and the lower gas flow channel 130 form a circular gas flow channel with a diameter of 2 cm to 4 cm, a circular channel for placing the foam board 400 is disposed in the gas flow channel, a diameter of the circular channel ranges from 4 mm to 6 mm, a thickness of the circular channel ranges from 1 mm to 1.5 mm, the foam board 400 is circular, a diameter of the foam board 400 ranges from 4 mm to 6 mm, and a thickness of the foam board 400 ranges from 1 mm to 1.5 mm. Specifically, the foam board 400 is a circular copper sheet or a circular aluminum sheet, and is preferably the copper sheet. The foaming structure is porous or grooved, and is preferably porous. The surfactant is sodium aliphatate, AEC, or AES.

In some embodiments, the fluid mixing region 110 is provided with a microchannel 111, the microchannel 111 is linear, serpentine, or S-shaped, the microchannel 111 is configured for mixing the liquid to be detected with detection liquid, a width of the microchannel 111 ranges from 500 μm to 300 μm, and a depth of the microchannel 111 ranges from 30 μm to 200 μm.

It is easy to understand that, diameters of the upper optical detection through hole 220 and the lower optical detection through hole 120 both range from 15 mm to 20 mm, the lower optical detection through hole 120 is connected with the fluid mixing region 110 through the microchannel 111, and diameters of the sample inlet 240 and the sample outlet 210 range from 500 μm to 3,000 μm. The glass cover plate 300 is circular, a diameter of the glass cover plate 300 ranges from 500 μm to 3,000 μm, a thickness of the glass cover plate 300 ranges from 1 mm to 2 mm, one glass cover plate 300 is connected with the upper plate 200 at the upper optical detection through hole 220 through plasma bonding and hot pressing, and the other glass cover plate 300 is connected with the substrate 100 at the lower optical detection through hole 120 through plasma bonding and hot pressing. The microchannel 111, the upper optical detection through hole 220, the lower optical detection through hole 120, the circular channel and the foaming structure are all machined by laser machining, photoetching, chemical etching and other methods.

In a specific embodiment, a microfluidic ion detection chip having a bubble brightening structure comprises a substrate 100, an upper plate 200, two glass cover plates 300, and a foam board 400. The substrate 100 and the upper plate 200 are both made of PDMS, lengths of the substrate and the upper plate are both 5 cm, widths of the substrate and the upper plate are both 5 cm, and thicknesses of the substrate and the upper plate are both 0.5 cm. The fluid mixing region on the substrate 100 is provided with a serpentine microchannel 111, and the microchannel 111 is etched by photoetching. During photoetching, a non-contact su-8 photoresist is coated, a thickness of the photoresist is 2 μm, and exposure and development are carried out with ultraviolet light to obtain the microchannel 111 with an average width of 500 μm, an average depth of 30 μm and a total length of 5 cm, so that a detection solution and a solution to be detected may be fully mixed. A gas flow channel connected with an optical detection through hole is machined by the same photoetching process. Diameters of an upper gas flow channel 230 and a lower gas flow channel 130 are both 1.5 mm. A lower optical detection through hole 120 in the substrate 100 and an upper optical detection through hole 220 in the upper plate 200 are both machined by laser machining. A laser device with an emission angle of 0.001 rad is selected during machining, and laser energy is controlled to be 1 J, with 20 pulses per second. Diameters of the optical detection through holes machined are both 15 mm. A sample inlet and a sample outlet are machined by the same method, and diameters of the sample inlet and the sample outlet machined are both 500 μm. Peripheries of the substrate 100 and the upper plate 200 are coated with a UV adhesive, and irradiated with ultraviolet light after the two plates are pressed. After the two plates are bonded, the upper gas flow channel 230 and the lower gas flow channel 130 form a circular gas flow channel with a diameter of 3 mm as a gas inlet, and a circular channel with a diameter of 5 mm and a width of 1 mm exists in the gas flow channel, which is manufactured in advance by the same photoetching process for placing the foam board 400. The foam board 400 is a circular copper sheet with a diameter of 5 mm and a thickness of 1 mm, and has a grooved foaming structure obtained by the same photoetching process. The foam board 400 is coated with sodium aliphatate, which is convenient for forming bubbles. The glass cover plates 300 are both circular, with a diameter of 15 mm and a thickness of 1 mm, and are respectively connected with the substrate 100 and the upper plate 200 by plasma bonding at positions of the upper optical detection through hole 220 and the lower optical detection through hole 120. The glass cover plate 300 is conductive to detecting light incidence, and may be used as a visible window to for observing bubble generation.

Figure 1:
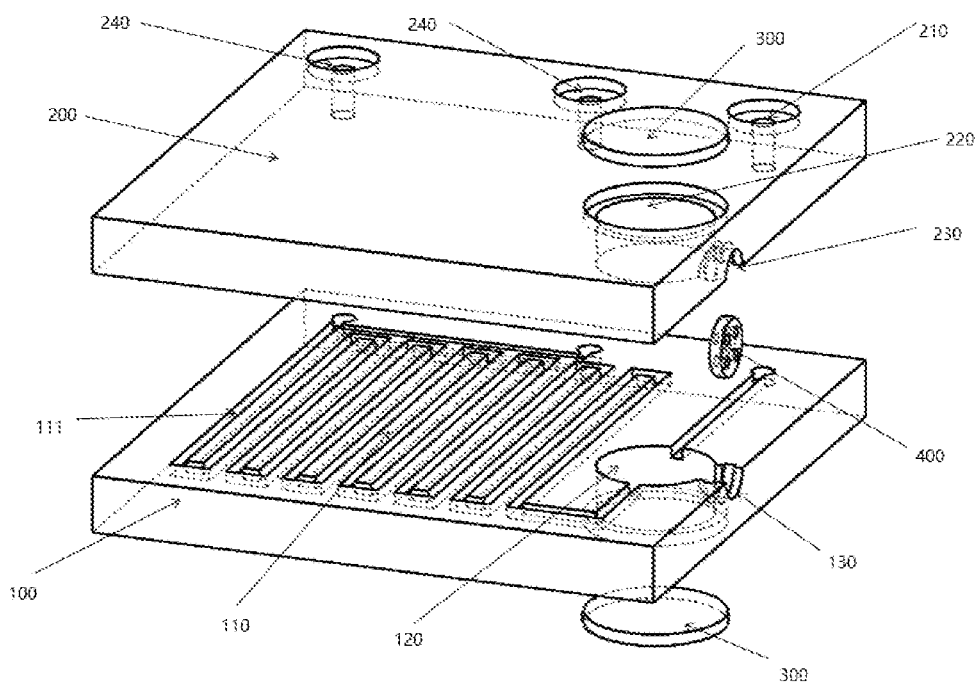
FIG. 1 is a schematic structural diagram of a microfluidic ion detection chip according to an embodiment of the disclosure.
Figure 2:
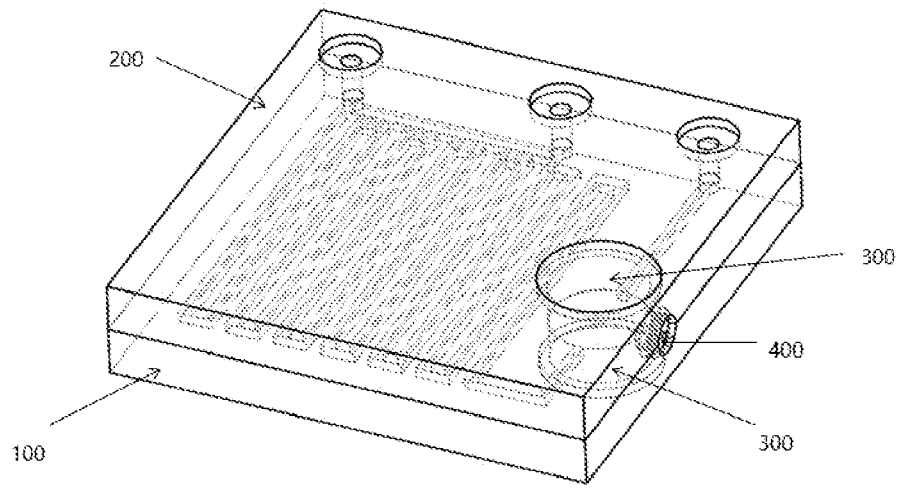
FIG. 2 is an overall assembly diagram of the microfluidic ion detection chip according to an embodiment of the disclosure.
Figure 3:
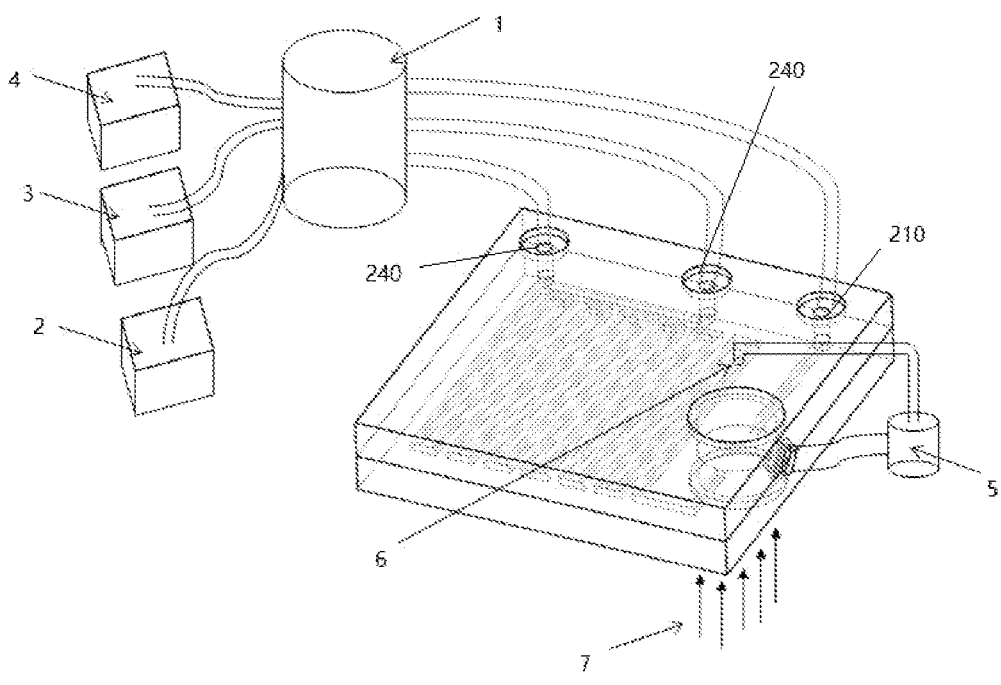
FIG. 3 is a diagram showing the detection using the microfluidic ion detection chip according to an embodiment of the disclosure.

With reference to FIG. 3, an ion detection method using the microfluidic ion detection chip having a bubble brightening structure according to an embodiment in the first aspect is provided, which comprises:

S1: respectively connecting the two sample inlets 240 and the sample outlet 210 with a detection reagent pool 2, a to-be-detected reagent pool 3, and a waste liquid recovery pool 4 through a peristaltic pump 1 and a polytetrafluoroethylene tube, wherein the polytetrafluoroethylene tube is connected with the sample inlet 240 through epoxy resin, the detection reagent pool 2 is filled with a solution changeable in an optical parameter such as brightness or absorbance due to reaction with corresponding ions to be detected, and the to-be-detected reagent pool 3 is filled with heavy metal ions polluting water quality;

S2: connecting the gas flow channel with a gas pump 5 through a polytetrafluoroethylene tube, wherein a flow rate of the gas pump 5 ranges from 0.8 L/min to 1.3 L/min, and a generation rate and a generation number of bubbles entering the gas flow channel and the optical detection region are adjusted by controlling a flow rate of the gas pump 5 and a shape of the foam board 400; and S3: placing an excitation light source 6 below the optical detection region, wherein the excitation light source 6 is an ultraviolet lamp or a blue LED, and placing a photoelectric detector 7 above the optical detection region, wherein the photoelectric detector 7 is an optical fiber probe or a CCD (Charge-Coupled Device) cosine detector, so as to receive and send a photoelectric detection signal.

The ion detection method has the advantages of high sensitivity and low limit of detection because of the foaming and brightening detection structure.

In a specific embodiment, an ion detection method comprises:

1. connecting one sample inlet 240 with a mercury ion to-be-detected solution pool through an industrial peristaltic pump and a polytetrafluoroethylene tube with a diameter of 0.5 mm, connecting the other sample inlet 240 with a carbon quantum dot liquid pool through an industrial peristaltic pump and a polytetrafluoroethylene tube with a diameter of 0.5 mm, and connecting a sample outlet 210 with a waste liquid recovery pool 4 through an industrial peristaltic pump and a polytetrafluoroethylene tube with a diameter of 0.5 mm;

2. connecting one end of a 3 mm gas pipeline with a gas flow channel and the other end with a micro gas pump, and adjusting bubbles entering the gas flow channel and a optical detection region by controlling a flow rate of a micro gas pump to be 0.8 L/min; and 3. placing a ultraviolet LED with an emission wavelength of 365 nm below the optical detection region, and placing an optical fiber photodetector above the optical detection region to receive and send a photoelectric detection signal, thus completing a detection process.

The peristaltic pump is used to provide the carbon quantum dot solution for the microfluidic ion detection chip as the detection reagent, and a mercury ion-containing solution is used as the to-be-detected reagent. The micro gas pump is used to introduce bubbles into the microfluidic ion chip at a rate of 0.8 L/min through the gas flow channel, so that the brightness is increased by 1.2 times.

In other embodiments, the microchannel 111 in the fluid mixing region is set to be S-shaped instead of being serpentine, the foam board 400 is etched with a porous structure instead of a grooved structure, and detection ions are trivalent iron ions instead of mercury ions. In order to change a size of bubbles introduced during optical detection, the brightening function structure of the foam board 400 is further reduced to be changed from the grooved structure into the porous structure, thus further improving the brightening degree of bubbles. The peristaltic pump is used to provide the carbon quantum dot solution for the microfluidic ion detection chip as the detection reagent, and an iron ion-containing solution is used as the to-be-detected reagent. The micro gas pump is used to introduce bubbles into the microfluidic ion detection chip at a rate of 0.8 L/min through the gas flow channel, so that the foaming structure is improved. Compared with the grooved structure, the porous structure makes the introduced bubbles smaller and the number of bubbles in the solution larger, the brightening degree is higher during optical detection, and a final brightness is increased by 2.46 times.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

What is claimed is:

1. A microfluidic ion detection chip having a bubble brightening structure, comprising:

a substrate, wherein the substrate is provided with a fluid mixing region, a lower optical detection through hole, and a lower gas flow channel;

an upper plate, wherein the upper plate is adhesively connected to the substrate, the upper plate is provided with a sample outlet, an upper optical detection through hole, an upper gas flow channel, and two sample inlets, and the upper gas flow channel and the lower gas flow channel are combined to form a gas flow channel;

two glass cover plates, wherein the two glass cover plates are respectively disposed at the lower optical detection through hole and the upper optical detection through hole, the two glass cover plates are respectively bonded to the substrate and the upper plate, and the glass cover plates are configured for cooperating with ion optical detection; and a foam board, wherein the foam board is provided with a foaming structure capable of generating bubbles and a surfactant coated on the foam board, and the foam board is disposed at the gas flow channel.

2. The microfluidic ion detection chip having a bubble brightening structure according to claim 1, wherein sizes of the substrate and the upper plate are the same, lengths of the substrate and the upper plate both range from 3 cm to 5 cm, widths of the substrate and the upper plate both range from 3 cm to 5 cm, and thicknesses of the substrate and the upper plate both range from 0.5 cm to 2 cm.

3. The microfluidic ion detection chip having a bubble brightening structure according to claim 1, wherein the substrate and the upper plate are made of PMMA, PDMS, or a quartz material, and the substrate and the upper plate are bonded through a UV adhesive.

4. The microfluidic ion detection chip having a bubble brightening structure according to claim 1, wherein a circular channel for placing the foam board is disposed in the gas flow channel, a diameter of the circular channel ranges from 4 mm to 6 mm, a thickness of the circular channel ranges from 1 mm to 1.5 mm, the foam board is circular, a diameter of the foam board ranges from 4 mm to 6 mm, and a thickness of the foam board ranges from 1 mm to 1.5 mm.

5. The microfluidic ion detection chip having a bubble brightening structure according to claim 1, wherein the foaming structure is porous or grooved, and the surfactant is sodium aliphatate, AEC, or AES.

6. The microfluidic ion detection chip having a bubble brightening structure according to claim 1, wherein the fluid mixing region is provided with a microchannel, the microchannel is linear, serpentine, or S-shaped, a width of the microchannel ranges from 500 μm to 300 μm, and a depth of the microchannel ranges from 30 μm to 200 μm.

7. The microfluidic ion detection chip having a bubble brightening structure according to claim 6, wherein diameters of the upper optical detection through hole and the lower optical detection through hole both range from 15 mm to 20 mm, the lower optical detection through hole is connected with the fluid mixing region through the microchannel, and diameters of the sample inlets and the sample outlet range from 500 μm to 3,000 μm.

8. The microfluidic ion detection chip having a bubble brightening structure according to claim 1, wherein the glass cover plates are both circular, with a diameter ranging from 500 μm to 3,000 μm and a thickness ranging from 1 mm to 2 mm, one of the glass cover plates is connected with the upper plate at the upper optical detection through hole through plasma bonding and hot pressing, and the other glass cover plate is connected with the substrate at the lower optical detection through hole through plasma bonding and hot pressing.

9. An ion detection method using the microfluidic ion detection chip having a bubble brightening structure according to claim 1, comprising:

S1: respectively connecting the two sample inlets and the sample outlet with a detection reagent pool, a to-be-detected reagent pool, and a waste liquid recovery pool through a peristaltic pump and a polytetrafluoroethylene tube;

S2: connecting the gas flow channel with a gas pump through a polytetrafluoroethylene tube; and S3: placing an excitation light source below an optical detection region, and placing a photoelectric detector above the optical detection region to receive and send a photoelectric detection signal.

10. The ion detection method according to claim 9, wherein the polytetrafluoroethylene tube is connected with the sample inlet through epoxy resin, the detection reagent pool is filled with a solution changeable in an optical parameter due to reaction with corresponding ions to be detected, the to-be-detected reagent pool is filled with heavy metal ions polluting water quality, a flow rate of the gas pump ranges from 0.8 L/min to 1.3 L/min, the excitation light source is an ultraviolet lamp or a blue LED, and the photoelectric detector is an optical fiber probe or a CCD cosine detector.

11. The ion detection method according to claim 10, wherein the optical parameter comprises brightness or absorbance.

* * * * *